UNITED STATES PATENT OFFICE.

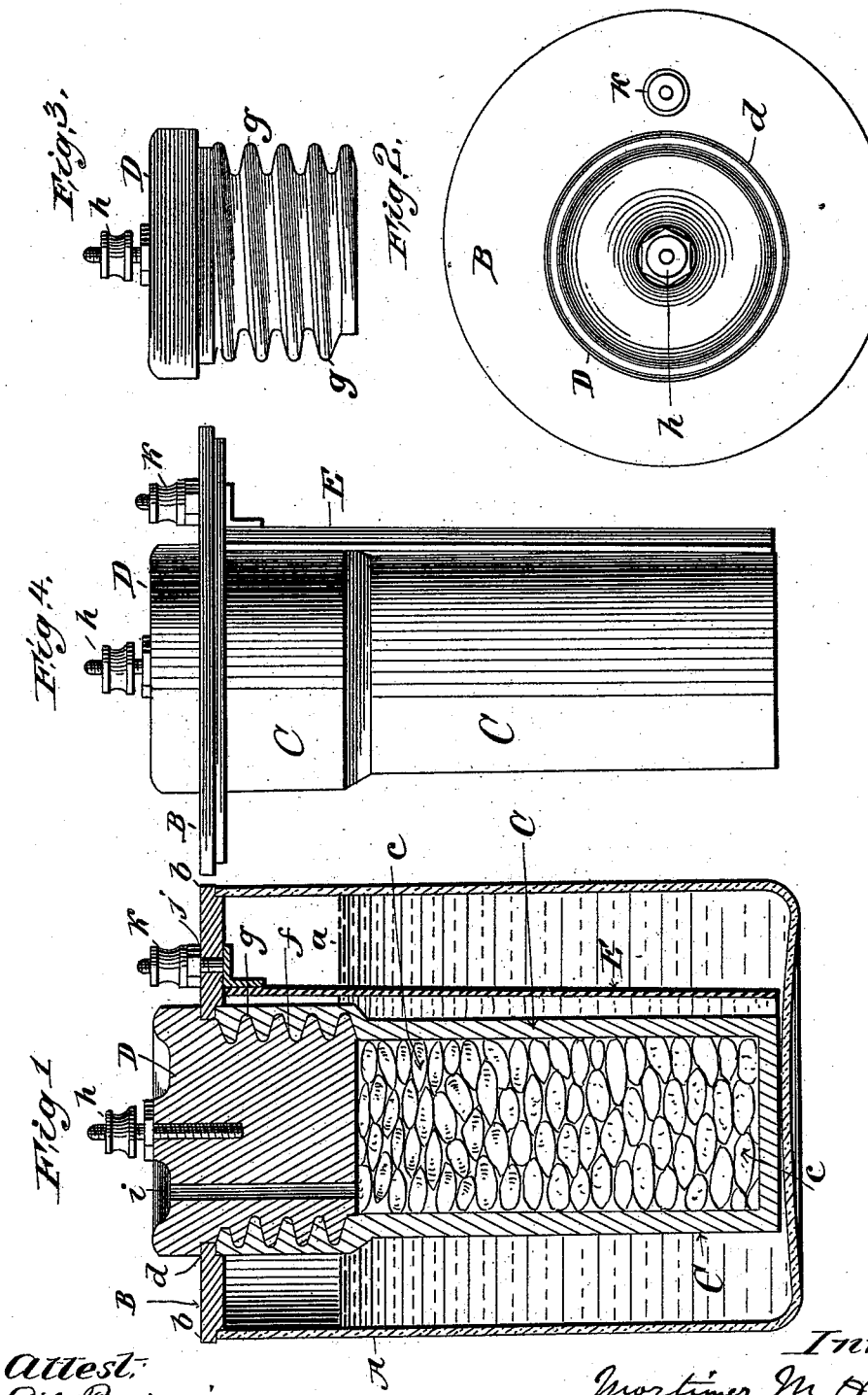

MORTIMER M. HAYDEN, OF NEW YORK, N. Y.

GALVANIC BATTERY.

SPECIFICATION forming part of Letters Patent No. 528,669, dated November 6, 1894.

Application filed February 21, 1894. Serial No. 500,955. (No model.)

*To all whom it may concern:*

Be it known that I, MORTIMER M. HAYDEN, a citizen of the United States, residing in the city, county, and State of New York, have invented certain new and useful Improvements in Galvanic Batteries, of which the following is a specification.

My invention relates to that class of galvanic batteries known as the open circuit type. Hitherto, difficulties have arisen in the use of such batteries, owing to the fact that strength of current is apt to be produced at the expense of durability and durability at the expense of strength.

The object of my invention is to provide a galvanic battery of such construction that a greater amount of combined strength and durability is secured and so formed that the chemical reagents employed can be quickly and easily removed, as occasion requires. To this end, I employ instead of the usual carbon electrode a porous cup adapted to contain powdered carbon and manganese or other suitable depolarizing agent and suspend this cup, as also the zinc electrode, in the exciting solution, in such a way that the contents of the cup may be readily removed, and the gases formed in said cup may readily escape; and by reason of the relative positions of the zinc electrode and the carbon cup, the path of least resistance for the return current traverses the body of the zinc electrode, instead of lying at the water level of the exciting solution.

One form of my improved battery is shown in the accompanying drawings, in which—

Figure 1 is a vertical section. Fig. 2 is a top plan. Fig. 3 is a side elevation of the removable plug, which seals the porous cup and attaches the same to the cell cover. Fig. 4 is a side elevation of the battery, the glass outer vessel being removed.

Same letters indicate similar parts in the different drawings.

A is the outer vessel of glass or other usual and suitable material for containing the ordinary exciting solution $a$.

B is a removable cover made of hard rubber or other suitable material, to which the other parts of the battery are secured, and which is held down upon the upper rim of the jar A by the weight of said other parts. This cover is preferably made with an outwardly projecting flange $b$ for more perfect fitting to the top of the jar; but an annular groove corresponding to the periphery of the top of the jar may be substituted, if desired.

C is a porous cup of smaller diameter than the inclosing jar A and of suitable length to come within a convenient distance from the bottom of the jar, when suspended from the cover B, and takes the place of the carbon electrode sometimes employed in the batteries. This cup may be made of carbon, clay or other suitable, strong, porous substance and is closed at the bottom, but left open at the top. In this cup is to be placed the manganese and powdered carbon or other depolarizing agent $c$, for the purpose of preventing the cup from becoming clogged by the action of the exciting solution in or through its pores. This cup C is supported by the cover B by means of the plug D as follows: The cover B is provided with a central hole or opening $d$, the under side of the cover around the hole is sufficiently smooth to make a snug contact with the upper edge of the cup C, when brought against it; and the inside of said cup is screw threaded at $f$, from the top a convenient distance downward. The plug D is preferably made of carbon hardened to render it non-absorbent and is provided with an external screw thread $g$ corresponding to the internal screw thread $f$. The upper part of the plug D is made of larger diameter than the opening through the cover B and of sufficient strength to support the weight of the plug, together with the cup C and its contents. In the center of this plug is set the binding post $h$, to which one of the wires may be attached in the usual manner. Through the substance of the plug D runs the vent channel $i$ communicating with the interior of the cup and with the outside air, thus allowing the gases to escape as rapidly as they are formed in the inside of the cup. I have found that hermetically sealing the cup against the escape of gases generated therein interferes with and sometimes destroys the perfect action of the battery and that the vent is more effective when made through the plug, thus connecting the interior of the cup directly with the outside air, than when made in the cover of the jar.

The zinc electrode E is also supported by the cover B, and may be of any convenient size and shape, but is preferably in the form of a curved plate concentric with that portion of the porous cup, opposite which it is set. This zinc electrode is supported by the cover, as follows: The cover B is provided with a secondary opening $j$, through which projects the screw-threaded stem $k$ of the electrode, and which is then secured by the nut $l$. This projecting screw thread is provided with a screw cap $m$ and serves as the binding post of the other wire. The opening $j$ is so situated with regard to the center of the larger opening $d$, that when the zinc electrode is properly secured to the under side of the cover B, it will be rigidly held away from the porous cup at such a distance as to avoid any danger of contact therewith. The zinc electrode is either suspended in such a way that it tapers gradually toward the bottom of the cup or is otherwise offset at the water line, so that the distance between the zinc and the cup is greater at the water line than at points nearer the bottom of the cup. The importance of this in constituting a path of less resistance, which shall extend through the body of the zinc, will be readily understood by those who have had practical experience with the unequal consumption of zinc electrodes, where the water line constitutes the path of least resistance to the return current.

It is obvious that when the exciting solution is exhausted, it can be renewed by lifting the cover B with the devices attached thereto and pouring fresh liquid into the jar A; and the depolarizing agent can be replenished, when occasion requires, by removing the cover, unscrewing the plug and recharging the cup, after which the refilled cup is again attached to the cover and firmly secured thereto by the flanged plug, when the whole structure can be reinserted in the jar A.

I claim—

1. A galvanic battery provided with a cover, a detachable porous cup provided with internal screw threads at the top, and a screw threaded plug connecting said detachable cup to said cover, substantially as shown and for the purposes specified.

2. A galvanic battery provided with a cover, a detachable porous cup provided with internal screw threads at the top, and a screw threaded flanged plug connecting said detachable cup to said cover, substantially as shown and for the purposes specified.

3. A galvanic battery provided with a cover and with a porous cup provided with internal screw threads at the top, and a screw threaded flanged plug, whereby said cover is clamped between said cup and said flanged plug, substantially as described and for the purposes specified.

4. In a galvanic battery, a carbon porous cup provided with internal screw threads at the top, having a screw threaded plug made of carbon denser in quality than the cup itself, for the purpose set forth.

5. In a galvanic battery, a porous cup provided with internal screw threads at the top for containing a depolarizing agent, a screw threaded plug therefor, and a vent channel through said plug, substantially as described and for the purposes specified.

MORTIMER M. HAYDEN.

Witnesses:
W. P. PREBLE, Jr.,
J. KENNEDY.